United States Patent
Yi (10) Patent No.: US 11,233,699 B2
(45) Date of Patent: Jan. 25, 2022

(54) NETWORK SLICE CREATION METHOD AND MANAGEMENT AND ORCHESTRATION SYSTEM

(71) Applicant: DATANG MOBILE COMMUNICATIONS EQUIPMENT CO., LTD., Beijing (CN)

(72) Inventor: Jingfeng Yi, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 15/734,228

(22) PCT Filed: Feb. 18, 2019

(86) PCT No.: PCT/CN2019/075371
§ 371 (c)(1),
(2) Date: Dec. 2, 2020

(87) PCT Pub. No.: WO2019/233124
PCT Pub. Date: Dec. 12, 2019

(65) Prior Publication Data
US 2021/0211357 A1 Jul. 8, 2021

(30) Foreign Application Priority Data
Jun. 6, 2018 (CN) .......................... 201810576255.0

(51) Int. Cl.
*H04L 12/24* (2006.01)
*H04W 16/18* (2009.01)

(52) U.S. Cl.
CPC ...... *H04L 41/0893* (2013.01); *H04L 41/5041* (2013.01); *H04W 16/18* (2013.01)

(58) Field of Classification Search
CPC ............. H04L 41/0893; H04L 41/5041; H04L 41/0886; H04L 41/0896; H04L 41/0806;
(Continued)

(56) References Cited

U.S. PATENT DOCUMENTS

| 10,545,779 B2 * | 1/2020 | Gokurakuji ............... G06F 9/46 |
| 2019/0097946 A1 * | 3/2019 | Lokman ................. H04L 45/306 |

(Continued)

FOREIGN PATENT DOCUMENTS

| CN | 106161049 A | 11/2016 |
| CN | 106921977 A | 7/2017 |

(Continued)

OTHER PUBLICATIONS

3GPP TR 28.801 V15.0.0, 3rd Generation Partnership Project;Technical Specification Group Services and System Aspects; Telecommunication management; Study on management and orchestration of network slicing for next generation network (Release 15), total 78 pages, Sep. 2017.

(Continued)

*Primary Examiner* — Noel R Beharry
*Assistant Examiner* — Mohammed M Murshid
(74) *Attorney, Agent, or Firm* — Kilpatrick Townsend & Stockton, LLP (57) ABSTRACT

Disclosed are a network slice creation method and a management and orchestration system. The method includes MANO acquiring name information of a first slice network that needs to be created, the MANO acquiring first VNFD information corresponding to a first NS and second VNFD information corresponding to a first VNF, the MANO creating the first slice network corresponding to the name of the first slice network, the first NS corresponding to the name of the first NS, a subnet of the first NS, the first VNF corresponding to the name of the first VNF, and a subnet of the
(Continued)

first VNF, and the MANO creating at least one port and at least one virtualized network function component (VNFC), and connecting the at least one port to the at least one VNFC.

12 Claims, 3 Drawing Sheets

(58) Field of Classification Search
  CPC .......... H04W 16/18; G06F 2009/45595; G06F 9/45558; G06F 9/45533
  See application file for complete search history.

(56) References Cited

U.S. PATENT DOCUMENTS

| | | | | |
|---|---|---|---|---|
| 2019/0109756 | A1* | 4/2019 | Abu Lebdeh | G06F 9/5077 |
| 2019/0223055 | A1* | 7/2019 | Bor Yaliniz | H04W 48/16 |
| 2020/0228405 | A1* | 7/2020 | Fang | H04L 41/0843 |
| 2020/0313969 | A1* | 10/2020 | Li | H04L 41/0806 |
| 2020/0322232 | A1* | 10/2020 | Xia | H04L 41/5041 |
| 2020/0409743 | A1* | 12/2020 | Ni | H04L 41/0806 |

FOREIGN PATENT DOCUMENTS

| | | |
|---|---|---|
| CN | 106936519 A | 7/2017 |
| CN | 108023751 A | 5/2018 |
| CN | 108023757 A | 5/2018 |
| CN | 108024255 A | 5/2018 |
| WO | 2015149600 A1 | 10/2015 |
| WO | 2016121802 A1 | 8/2016 |
| WO | 2016121869 A1 | 8/2016 |
| WO | 2017080517 A1 | 5/2017 |

OTHER PUBLICATIONS

ETSI GS NFV-MAN 001 V1.1.1, Network Functions Virtualisation (NFV);Management and Orchestration, total 184 pages, Dec. 2014.
ETSI GR NFV-EVE 012 V3.1.1, Network Functions Virtualisation (NFV) Release 3; Evolution and Ecosystem; Report on Network Slicing Support with ETSI NFV Architecture Framework, total 35 pages, Dec. 2017.

* cited by examiner

NETWORK SLICE CREATION METHOD AND MANAGEMENT AND ORCHESTRATION SYSTEM

The present application is a US National Stage of International Application No. PCT/CN2019/075371, filed Feb. 18, 2019, which claims priority to Chinese Patent Application No. 201810576255.0, filed with the Chinese Patent Office on Jun. 6, 2018 and entitled "Network Slice Creation Method and Management and Orchestration System", which is hereby incorporated by reference in its entirety.

FIELD

The disclosure relates to the field of communications technologies, and particularly to a network slice creation method and a management and orchestration system.

BACKGROUND

In order to meet the widely-changed service needs, the network slice technology is applied in the communication system. According to different application scenarios and needs, a physical network is divided into multiple virtual end-to-end network slices, where each network slice is composed of one independent network function or the instantiation of a function combination, and has different functional characteristics, to provide different services to users through the multiple network slices without affecting each other.

In the prior art, a Management and Orchestration (MANO) system is usually used for network slice deployment. The process of deploying a network slice is as follows.

Firstly, a provider is established manually for the network slice based on the latency and bandwidth requirement of the network slice as well as different physical interface capabilities and numbers the Network Functions Virtualization Infrastructure (NFVI) creating the network slice possesses. Secondly, the internal information of the network slice is manually filled in the Virtualized Network Function Descriptor (VNFD), for example, the information about different Network Services (NS's) contained inside the network slice (for example, the NS's may be divided into shared subnets and dedicated subnets), the information about the Virtualized Network Function (VNF) module in the network slice (for example, the VNF sometimes has a need to isolate from the Virtual Local Area Network (VLAN) and at this time needs to establish a private network, and sometimes has no need to isolate from the VLAN and at this time uses the shared network, etc.), the information about the segment ID assigned to the VNF private network, and the information about the subnets, ports and Virtualized Network Function Components (VNFCs) established on these networks. Finally, the VNFD is handed over to the MANO, and the MANO works based on the description of the VNFD, creates the required network service and forms the network slice.

As can be seen, in the prior art, there is a need to manually determine a large amount of network deployment information when establishing a network slice, which requires a large amount of manual work, causing a problem of low efficiency in deploying the network slice.

SUMMARY

The disclosure provides a method for creating a network slice and a management and orchestration system, to solve the problem of low efficiency in establishing a network slice in the prior art.

A first aspect of the disclosure provides a method for creating a network slice, which includes:

obtaining, by a Management and Orchestration system (MANO), name information of a first network slice to be created; and the name information includes a name of a data center network to which the first network slice belongs, a name of a first slice network contained in the first network slice, a name of a first Network Service (NS) contained in the first slice network, and a name of a first Virtual Network Function (VNF) contained in the first NS, and the data center network is established according to a preset provider network;

obtaining, by the MANO, first Virtualized Network Function Descriptor (VNFD) information corresponding to the first NS and second VNFD information corresponding to the first VNF; and the MANO stores a plurality of preset NSs, a plurality of preset VNFs, VNFD information corresponding to each of the plurality of preset NSs, and VNFD information corresponding to each of the plurality of preset VNFs, the plurality of preset NSs include the first NS, and the plurality of preset VNFs include the first VNF;

creating, by the MANO, the first slice network corresponding to the name of the first slice network, the first NS corresponding to the name of the first NS, a subnet of the first NS, the first VNF corresponding to the name of the first VNF, and a subnet of the first VNF according to the first VNFD information and the second VNFD information;

creating, by the MANO, at least one port and at least one Virtualized Network Function Component (VNFC) in any one or more networks among the subnet of the first NS and the subnet of the first VNF, and connecting the at least one port to the at least one VNFC in one to one correspondence, to provide network services for a client connected to the first slice network through the VNFC.

In a possible embodiment, creating, by the MANO, the first slice network, the first NS, a subnet of the first NS, the first VNF and a subnet of the first VNF according to the first VNFD information and the second VNFD information, includes:

creating, by the MANO, an external network contained in the first NS, a subnet of the external network contained in the first NS, an internal network contained in the first NS and a subnet of the internal network contained in the first NS according to the first VNFD information and a preset network design rule;

creating, by the MANO, an internal network contained in the first VNF, a subnet of the internal network contained in the first VNF, an external network contained in the first VNF and a subnet of the external network contained in the first VNF according to the second VNFD information and the preset network design rule;

and the preset network design rule is that the first slice network is created using the data center network, the external network contained in the first NS and the subnet of the external network contained in the first NS are created using any one of the data center network and the first slice network, the external network contained in the first VNF and the subnet of the external network contained in the first VNF are created using any one of the data center network, the first slice network and the external network contained in the first NS, the internal network contained in the first NS and the subnet of the internal network contained in the first NS are created according to a first provider network, the internal network contained in the first VNF and the subnet of the internal network contained in the first VNF are created according to a second provider network.

In a possible embodiment, creating, by the MANO, an internal network contained in the first NS and a subnet of the internal network contained in the first NS according to the first VNFD information and a preset network design rule, includes:

obtaining, by the MANO, N external connection points of the internal network contained in the first NS and a bandwidth required by each of the plurality of external connection points from the first VNFD information, and N is a positive integer;

obtaining, by the MANO, physical network resources of each of a plurality of Virtualized Infrastructure Managers (VIMs) connected to the MANO itself; and the physical network resources are used to provide network services to provider networks created on the physical network resources, the physical network resources include M configured Network Interface Cards (NICs) and a bandwidth of each NIC, and M is an integer greater than or equal to N;

selecting, by the MANO, a first VIM from the plurality of VIMs according to the number of the N external connection points and the bandwidth required by each external connection point;

creating, by the MANO, provider networks corresponding to the external connection points according to the N external connection points and the first VIM;

creating, by the MANO, the internal network contained in the first NS and the subnet of the internal network contained in the first NS on the provider networks corresponding to the external connection points.

In a possible embodiment, creating, by the MANO, provider networks corresponding to the external connection points according to the N external connection points and the first VIM, includes:

determining, by the MANO, N mapping relationships according to the bandwidth required by each of the N external connection points and the bandwidth of each NIC; and the N external connection points one-to-one correspond to N NICs of the M NICs;

creating, by the MANO, N provider networks according to the N mapping relationships; and a name of each of the N provider networks includes an identity of an external connection point and an identity of an NIC contained in a mapping relationship corresponding to the provider network;

assigning, by the MANO, a network segment number to each of the N provider networks.

In a possible embodiment, after the MANO assigns the network segment number to each of the N provider networks, the method further includes:

assigning, by the MANO, a subnet segment number to the subnet of the internal network contained in the first NS from a network segment number of a provider network to which the subnet belongs according to ranking of the subnet in the provider network to which the subnet belongs.

A second aspect of the disclosure provides a management and orchestration system, which includes:

a first obtaining device configured to obtain name information of a first network slice to be created; and the name information includes a name of a data center network to which the first network slice belongs, a name of a first slice network contained in the first network slice, a name of a first NS contained in the first slice network, and a name of a first VNF contained in the first NS, and the data center network is established according to a preset provider network;

a second obtaining device configured to obtain first VNFD information corresponding to the first NS and second VNFD information corresponding to the first VNF; and the MANO stores a plurality of preset NSs, a plurality of preset VNFs, VNFD information corresponding to each of the plurality of preset NSs, and VNFD information corresponding to each of the plurality of preset VNFs, the plurality of preset NSs include the first NS, and the plurality of preset VNFs include the first VNF;

a first creating device configured to create the first slice network corresponding to the name of the first slice network, the first NS corresponding to the name of the first NS, a subnet of the first NS, the first VNF corresponding to the name of the first VNF, and a subnet of the first VNF according to the first VNFD information and the second VNFD information;

a second creating device configured to create at least one port and at least one VNFC in any one or more networks among the subnet of the first NS and the subnet of the first VNF, and connect the at least one port to the at least one VNFC in one to one correspondence, to provide network services for a client connected to the first slice network through the VNFC.

In a possible embodiment, the first creating device is configured to:

create an external network contained in the first NS, a subnet of the external network contained in the first NS, an internal network contained in the first NS and a subnet of the internal network contained in the first NS according to the first VNFD information and a preset network design rule;

create an internal network contained in the first VNF, a subnet of the internal network contained in the first VNF, an external network contained in the first VNF and a subnet of the external network contained in the first VNF according to the second VNFD information and the preset network design rule;

and the preset network design rule is that the first slice network is created using the data center network, the external network contained in the first NS and the subnet of the external network contained in the first NS are created using any one of the data center network and the first slice network, the external network contained in the first VNF and the subnet of the external network contained in the first VNF are created using any one of the data center network, the first slice network and the external network contained in the first NS, the internal network contained in the first NS and the subnet of the internal network contained in the first NS are created according to a first provider network, the internal network contained in the first VNF and the subnet of the internal network contained in the first VNF are created according to a second provider network.

In a possible embodiment, the first creating device is specifically configured to:

obtain N external connection points of the internal network contained in the first NS and a bandwidth required by each of the plurality of external connection points from the first VNFD information, and N is a positive integer;

obtain physical network resources of each of a plurality of VIMs connected to the MANO itself; and the physical network resources are used to provide network services to provider networks created on the physical network resources, the physical network resources include M configured NICs and a bandwidth of each NIC, and M is an integer greater than or equal to N;

select a first VIM from the plurality of VIMs according to the number of the N external connection points and the bandwidth required by each external connection point;

create provider networks corresponding to the external connection points according to the N external connection points and the first VIM;

create the internal network contained in the first NS and the subnet of the internal network contained in the first NS on the provider networks corresponding to the external connection points.

In a possible embodiment, the first creating device is configured to:

determine N mapping relationships according to the bandwidth required by each of the N external connection points and the bandwidth of each NIC; and the N external connection points one-to-one correspond to N NICs of the M NICs;

create N provider networks according to the N mapping relationships; and a name of each of the N provider networks includes an identity of an external connection point and an identity of an NIC contained in a mapping relationship corresponding to the provider network;

assign a network segment number to each of the N provider networks.

In a possible embodiment, after the MANO assigns a network segment number to each of the N provider networks, the first creating device is further configured to:

assign a subnet segment number to the subnet of the internal network contained in the first NS from a network segment number of a provider network to which the subnet belongs according to ranking of the subnet in the provider network to which the subnet belongs.

A third aspect of the disclosure provides a management and orchestration system including a processor and a communication interface, and the communication interface receives and transmits the data under the control of the processor, and the management and orchestration system further includes a memory storing a preset program therein, where the processor reads the program in the memory and performs the following process according to the program:

the communication interface is configured to obtain the name information of a first network slice to be created under the control of the processor; and the name information includes the name of a data center network to which the first network slice belongs, the name of a first slice network contained in the first network slice, the name of a first NS contained in the first slice network, and the name of a first VNF contained in the first NS, and the data center network is established according to a preset provider network; and obtain the first VNFD information corresponding to the first NS and the second VNFD information corresponding to the first VNF; and the MANO stores a plurality of preset NSs, a plurality of preset VNFs, the VNFD information corresponding to each of the plurality of preset VNFs, the VNFD information corresponding to each of the plurality of preset VNFs, the plurality of preset NSs include the first NS, and the plurality of preset VNFs include the first VNF;

the processor is configured to create the first slice network corresponding to the name of the first slice network, the first NS corresponding to the name of the first NS, a subnet of the first NS, the first VNF corresponding to the name of the first VNF, and a subnet of the first VNF according to the first VNFD information and the second VNFD information; and create at least one port and at least one VNFC in any one or more networks among the subnet of the first NS and the subnet of the first VNF, and connect the at least one port to the at least one VNFC in one to one correspondence, to provide network services for a client connected to the first slice network through the VNFC.

A fourth aspect of the disclosure provides a computer device, which includes:

at least one processor, and a memory and a communication interface communicatively connected to the at least one processor;

and the memory stores instructions that, when executed by the at least one processor, cause the at least one processor to perform the method of any one of the first aspect via the communication interface.

A fifth aspect of the disclosure provides a computer readable storage medium storing computer instructions that, when running on the computer, cause the computer to perform the method of any one of the first aspect.

The embodiments of the disclosure has the following beneficial effects.

In the MANO, the network slice is firstly divided into four levels, which are the data center-level network, slice-level network, NS-level network and VNF-level network successively from large to small. The data center-level network is created according to a preset provider network, and pre-stores a plurality of preset NSs, a plurality of preset VNFs, the VNFD information corresponding to each of the plurality of preset NSs, and the VNFD information corresponding to each of the plurality of preset VNFs in the database. When a technician needs to use the MANO to create a network slice, he only needs to enter the name information of the first slice network to be created (i.e., the name of the data center network to which the first slice network to be created belongs, the name of the first slice network, the name of a first NS contained in the first slice network, and the name of a first VNF contained in the first NS) in the MANO. Thus, after obtaining the name information of the first slice network to be created, the MANO automatically obtains the first VNFD information corresponding to the first NS and the second VNFD information corresponding to the first VNF from the database, and determines, from the first VNFD information and second VNFD information, what slice network is created on a data center-level network with what name, how many NS networks are included in the slice network, how many VNF networks are included in the NS network, and the connection relationship among all the networks, and then automatically creates the first slice network corresponding to the name of the first slice network, the first NS corresponding to the name of the first NS, the subnet of the first NS, the first VNF corresponding to the name of the first VNF, and the subnet of the first VNF; and creates at least one port and at least one VNFC in any one or more networks among the subnet of the first NS and the subnet of the first VNF, connects the at least one port to the at least one VNFC in one to one correspondence, to provide network services for a client connected to the first slice network through the VNFC, and completes the process of creating the network slice, reducing the manual work of the technician, improving the deployment efficiency of the network slice, and also further reducing the error rate of the network deployment.

Further, the above embodiments are versatile for network slices with different requirements, that is, for various network slices, the description data may be automatically filled for the template to be deployed according to the above method, reducing the implementation complexity and difficulty of network orchestration.

DETAILED DESCRIPTION

The disclosure provides a method for creating a network slice and a management and orchestration system, to solve the problem of low efficiency in establishing a network slice in the prior art.

In order to solve the above problem, the general idea of the disclosure is as follows.

In the MANO, the network slice is firstly divided into four levels, which are the data center-level network, slice-level network, NS-level network and VNF-level network successively from large to small. The data center-level network is created according to a preset provider network, and pre-stores a plurality of preset NSs, a plurality of preset VNFs, the VNFD information corresponding to each of the plurality of preset NSs, and the VNFD information corresponding to each of the plurality of preset VNFs in the database. When a technician needs to create a network slice using the MANO, he only needs to enter the name information of the first slice network to be created (i.e., the name of the data center network to which the first slice network belongs, the name of the first slice network, the name of a first NS contained in the first slice network, and the name of a first VNF contained in the first NS) in the MANO. Thus, after obtaining the name information of the first slice network to be created, the MANO automatically obtains the first VNFD information corresponding to the first NS and the second VNFD information corresponding to the first VNF from the database, and determines from the first VNFD information and second VNFD information what slice network is created on a data center-level network with what name, how many NS networks are included in the slice network, how many VNF networks are included in the NS network, and the connection relationship among all the networks, and then automatically creates the first slice network corresponding to the name of the first slice network, the first NS corresponding to the name of the first NS, the subnet of the first NS, the first VNF corresponding to the name of the first VNF, and the subnet of the first VNF; and creates at least one port and at least one VNFC in any one or more networks among the subnet of the first NS and the subnet of the first VNF, connects the at least one port to the at least one VNFC in one to one correspondence, to provide network services for a client connected to the first slice network through the VNFC, and completes the process of creating the network slice, reducing the manual work of the technician, improving the deployment efficiency of the network slice, and also further reducing the error rate of the network deployment.

Further, the above embodiments are versatile for network slices with different requirements, that is, there is no need to fill a large amount of data for network slices with different requirements in the VNFD, reducing the implementation complexity and difficulty of network orchestration.

Figure 1:
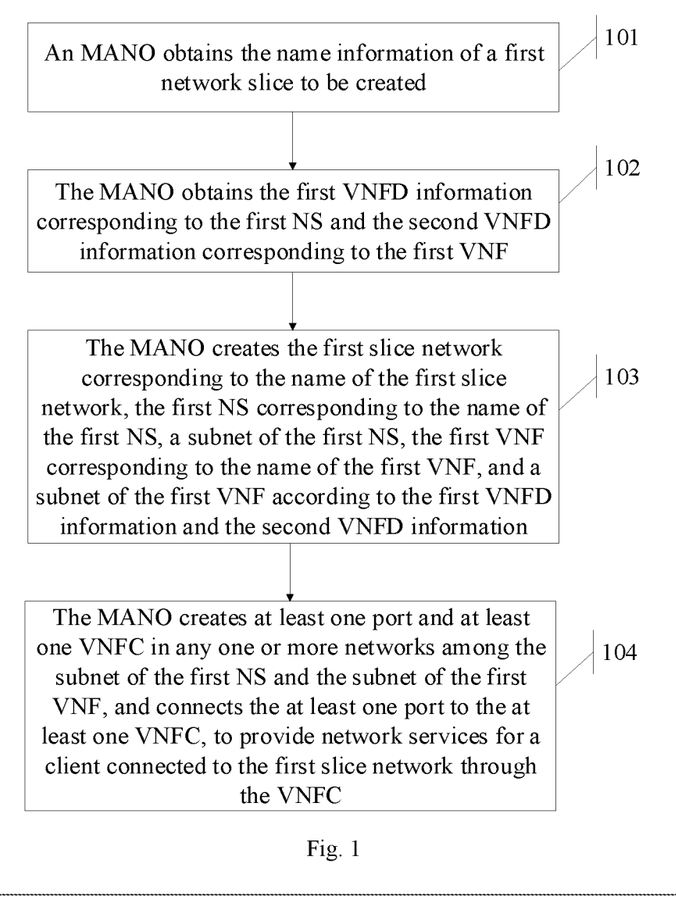
FIG. 1 is a flow chart of a method for creating a network slice according to an embodiment of the disclosure.

FIG. 1 is a flow chart of a method for creating a network slice according to an embodiment of the disclosure. The flow chart is described as follows.

Step 101: an MANO obtains the name information of a first network slice to be created.

In an embodiment of the disclosure, the name information includes the name of a data center network to which the first network slice belongs, the name of a first slice network contained in the first network slice, the name of a first NS contained in the first slice network, and the name of a first VNF contained in the first NS, and the data center network is established according to a preset provider network.

In an implementation process, the entire network slice is divided into four levels in advance in the MANO, which are the data center-level network and its subnet; the slice-level network and its subnet; the NS-level network and its subnet; and the VNF-level network and its subnets successively from large to small.

Figure 2:
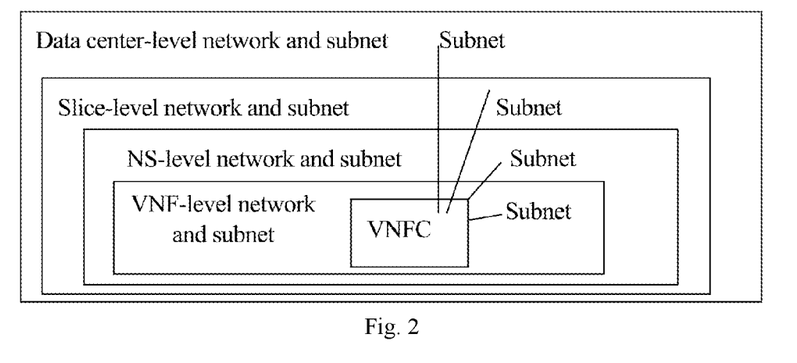
FIG. 2 is a schematic diagram of the reference relationship of four levels of networks according to an embodiment of the disclosure.

FIG. 2 is the reference relationship of the four levels of networks.

The data center level network of first level may be used by three levels of objects: slice-level network, NS-level network and VNF-level network. For example, when the slice-level network or NS-level network or VNF-level network does not specify its own network, it may indicate that this network uses the data center-level network of first level. The subnet of the data center network may be directly used for VNFC connection.

The slice-level network of second level is created for a tenant using the slice name, and may be used by the NS-level network and the VNF-level network contained in the slice. For example, the subordinate object contained in the slice-level network does not specify its own network, which may indicate that this network uses the slice-level network. The subnet of the slice-level network may be directly used for VNFC connection.

The NS-level network of third level is created for a tenant using the NS name, and may be used by the VNF-level network contained in the NS. For example, the VNF-level network does not specify its own network, which may indicate that this network uses the NS-level network. The subnet of the NS-level network may be directly used for VNFC connection.

The VNF-level network of fourth level is created for a tenant using the VNF name, and the subnet of the VNF-level network is used by the VNFC contained in the VNF-level network.

The network below the data center-level network is divided into an internal network and an external network. For example, the slice-level network is divided into a slice internal network and a slice external network, and the NS-level network is divided into an NS-level external network and an NS-level internal network.

Each level of network is divided into an internal network and an external network.

Figure 3:
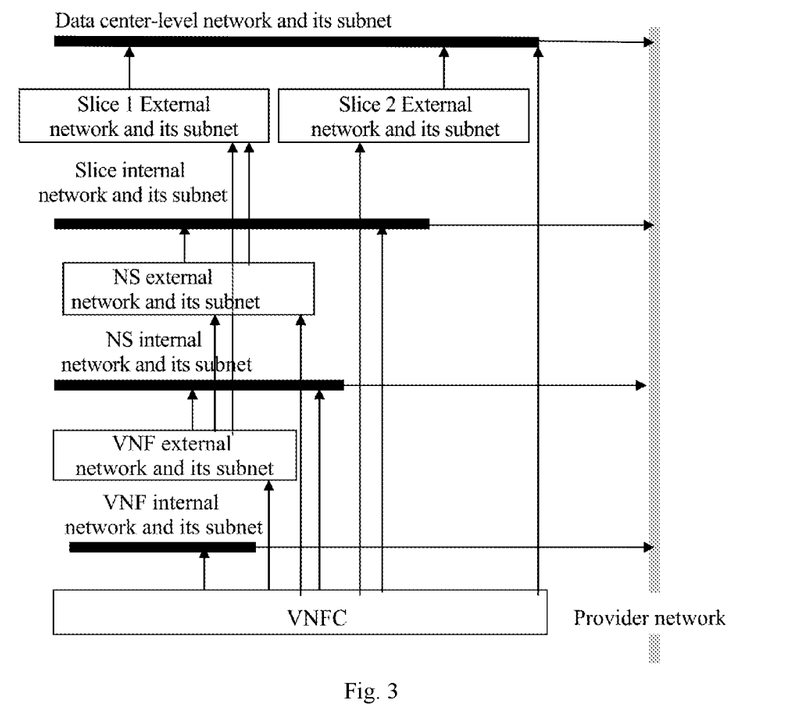
FIG. 3 is a schematic diagram of a model of the entire network according to an embodiment of the disclosure.

Based on the above multiple levels of networks, referring to FIG. 3, the model of the entire network in the MANO is as follows.

1. The data center-level network and its subnet aren't divided into the internal network and the external network, or are considered to be the internal network of the data center. The data center-level network and its subnet are described in the VNFD template of the slice-level network, and the external networks described in the VNFD of the slice-level network refer to the data center-level networks on which the slice is to rely. If the VNFDs of multiple slice-level networks describe the external networks with the same name to be relied on, all the attributes of the external networks with the same name described in the VNFDs of the multiple slice-level networks must be consistent, and the external networks with the same name are recognized as the data center-level network and designed as a shared attribute network, and its subnet is a shared subnet and may be used for VNFC connection within the slice-level network. The data center-level network needs to be created relying on a certain provider network, and the slice internal network needs to be created relying on a certain provider network.

2. The external networks and internal networks of all levels of networks cannot directly connect to the VNFC, and there is a need to create one or more subnets on a network and create a port on the subnet for the VNFC to connect to the port.

3. The subordinate external network may use the superior network and the superior's superior network. All the internal networks are specified as non-shared networks and can only be used by their subordinates or subordinate's subordinates. For example, the NS external network may use the slice external network. If its superior slice does not have an external network, the external network of the NS needs to be created based on a provider network. The NS internal network needs to be created relying on a provider network. The VNF external network may refer to its superior's NS external network or slice external network. If neither its superior NS nor slice has an external network, the external network of the VNF needs to be created based on a provider network. The VNF internal network needs to be created relying on a provider network. The VNFC may be connected to the subnet of the data center-level network according to the networking need, and may also be connected to the subnet of the slice to which it belongs, the subnet of the NS to which it belongs, and the subnet of the VNF to which it belongs.

In addition, the naming rule of each network, subnet and port in the MANO is as follows.

The Data Center (DC)-level network is named Dcname+_for+_slice name, and there may be one or more slice names; the slice internal network is named slice name+_internal+_net; the NS external network is named NS Name+_external+_net; the NS internal network is named NS name+_internal+_net; the VNF external network is named VNF name+_external+_net; the VNF internal network is named VNF name+_internal+_net; the subnet of each network is named the corresponding network name+_subnet; the port is named the corresponding subnet name+vnfc name+_port+_serial number, and of course, if the VNFC of a subnet has only one connection port, the port may also be named the corresponding subnet name+vnfc name+_port.

The MANO may pre-store some commonly-used network names and VNFD information, for example, pre-store multiple data center-level networks, and one DC name is: Chinamobilexian, and the other DC name is Chinamobilebeijing; pre-store multiple slice-level networks, and the slice name may be Enhanced Mobile Broadband (EMBB); pre-store multiple NS networks, and one NS name is: Virtual Evolved Packet Core (Vepc), and the other NS name is: Virtual Machine Edge computing (Vmec); pre-store multiple VNF-level networks, and the VNF names of the VNF-level networks are Access Control and Mobility Management Function (AMF), Session Management Function (SMF), User Plane Function (UPF), etc. Then, the interface of the MANO can display the names of these pre-stored networks. When an NS user needs to create a network slice, he can determine the name of the data center-level network, the name of the slice network, the NS name, and the NVF name of the network slice to be created directly by way of clicking selection, so that the MANO obtains the name information of the first slice network to be created.

Of course, when a user needs to create a network slice, he can also directly enter the names of all the networks in the input box of the MANO in the aforementioned naming way. For example, the user can enter the name of the data center-level network as: Chinamobilexian+_for+_EMBB, the name of the NS-level network as: Vepc+_internal+_net, etc., and then the MANO determines the name information of the first network to be created according to the user's input. It should be noted that the way in which the MANO obtains the name information of the first slice network is not limited in the embodiments of the disclosure.

After performing step 101, the method in the embodiment of the disclosure performs step 102, that is, the MANO obtains the first VNFD information corresponding to the first NS and the second VNFD information corresponding to the first VNF.

In an embodiment of the disclosure, the MANO stores a plurality of preset NSs, a plurality of preset VNFs, the VNFD information corresponding to each of the plurality of preset NSs, and the VNFD information corresponding to each of the plurality of preset VNFs, and the plurality of preset NSs contain the first NS, and the plurality of preset VNFs contain the first VNF.

After obtaining the names of all levels of networks of the first network slice to be created, the MANO obtains the VNFD information corresponding to the names of all levels of networks from the database of the MANO.

After step 102, the method in the embodiment of the disclosure proceeds to step 103, that is, the MANO creates the first slice network corresponding to the name of the first slice network, the first NS corresponding to the name of the first NS, a subnet of the first NS, the first VNF corresponding to the name of the first VNF, and a subnet of the first VNF according to the first VNFD information and the second VNFD information.

In an embodiment of the disclosure, an implementation of step 103 is as follows:

the MANO creates an external network contained in the first NS, a subnet of the external network contained in the first NS, an internal network contained in the first NS and a subnet of the internal network contained in the first NS according to the first VNFD information and a preset network design rule;

the MANO creates an internal network contained in the first VNF, a subnet of the internal network contained in the first VNF, an external network contained in the first VNF and a subnet of the external network contained in the first VNF according to the second VNFD information and the preset network design rule;

and the preset network design rule is that: the first slice network is created using the data center network, the external network contained in the first NS and the subnet of the external network contained in the first NS are created using any one of the data center network and the first slice network, the external network contained in the first VNF and the subnet of the external network contained in the first VNF are created using any one of the data center network, the first slice network and the external network contained in the first NS, the internal network contained in the first NS and the subnet of the internal network contained in the first NS are created according to a first provider network, the internal network contained in the first VNF and the subnet of the internal network contained in the first VNF are created according to a second provider network.

Following the above example, after obtaining the VNFD information corresponding to the name of each level of network, the MANO creates each level of network according to the description in the VNFD information. For example, the slice network is created using the data center level network. At first, an EMBB slice network is created on Chinamobilexian, then the external networks of Vepc and Vmec are created under the EMBB, and then the internal networks of Vepc and Vmec, namely AMF, SMF and UPF networks, are created. Since the NS internal network needs to be created based on the provider network, the process of creating the NS internal network is illustrated below.

In an embodiment of the disclosure, the MANO creates an internal network contained in the first NS and a subnet of the internal network contained in the first NS according to the first VNFD information and a preset network design rule, including:

the MANO obtains, from the first VNFD information, N external connection points of the internal network contained in the first NS and the bandwidth required by each of the plurality of external connection points, and N is a positive integer;

the MANO acquires the physical network resources of each of a plurality of VIMs connected to the MANO itself; and the physical network resources are used to provide network services to a provider network created on the physical network resources, the physical network resources include M configured NICs and the bandwidth of each NIC, and M is an integer greater than or equal to N;

the MANO selects a first VIM from the plurality of VIMs according to the number of the N external connection points and the bandwidth required by each external connection point;

the MANO creates provider networks corresponding to external connection points according to the N external connection points and the first VIM;

the MANO creates the internal network contained in the first NS and the subnet of the internal network contained in the first NS on the provider networks corresponding to the external connection points.

The MANO creates provider networks corresponding to the external connection points according to the N external connection points and the first VIM, including:

the MANO determines N mapping relationships according to the bandwidth required by each of the N external connection points and the bandwidth of each NIC; and the N external connection points one-to-one corresponds to N NICs of the M NICs;

the MANO creates N provider networks according to the N mapping relationships; and the name of each of the N provider networks includes an identity of an external connection point and an identity of an NIC contained in the mapping relationship corresponding to the provider network;

the MANO assigns a network segment number to each of the N provider networks;

the MANO assigns a subnet segment number to the subnet of the internal network contained in the first NS from the network segment number of the provider network to which the subnet belongs according to ranking of the subnet in the provider network to which the subnet belongs.

Figure 4:
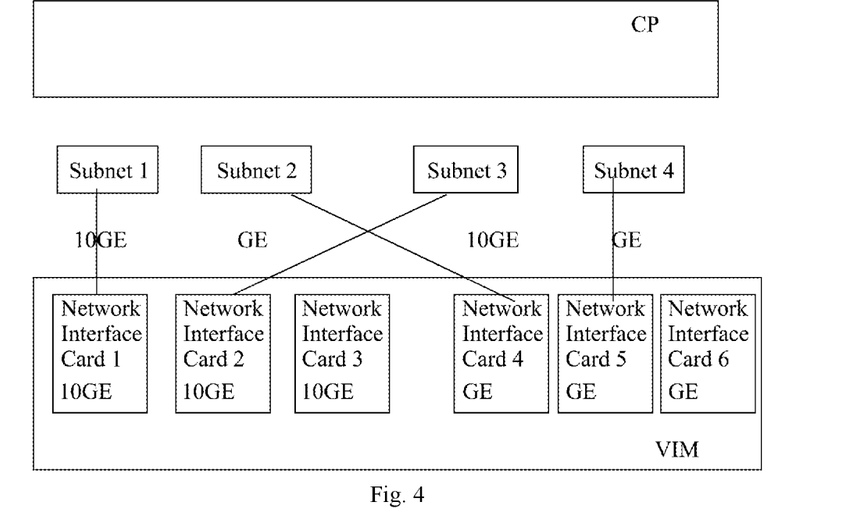
FIG. 4 is a schematic diagram of the mapping relationship between physical network resources and connection points according to an embodiment of the disclosure.

In an implementation process, the MANO firstly obtains the Connection Point (CP) description information from the VNFD of each NS network. For example, there are four connection points in an NS network, where two are based on the 10GE network, and two are based on the GE network. Then, the physical network resources in the VIM, the number of configured Network Interface Cards (NICs), and the NIC bandwidth are obtained by detecting resource on the accessed Virtualized infrastructure manager (VIM). For example, the list of VIMs connected to the MANO is invoked, the physical network resources in each VIM are obtained from the VIM, and the VIM of which the physical resource quantity and capability meet the resource requirement of the NS network is determined. For example, three 10GE interfaces in a certain VIM are obtained, where three GE interfaces meet the resource requirement of the NS network. Finally, the mapping of the physical network resources and connection points is performed, where CP1 uses NIC1, CP2 uses and connects to NIC4, CP3 uses NIC2, and CP4 uses NIC5, as shown in FIG. 4. The provider network is automatically named according to the mapping relationship, where the naming rule is provider+nic name+ bandwidth. The MANO can automatically invoke the Application Programming Interface (API) of the openstack to create the corresponding provider networks, which are respectively provider-nic1-10ge, provider-nic2-10ge, provider-nic4-ge, and provider-nic5-ge.

Then, the MANO segments the created provider network. The segment ID range of each network is planned to occupy 100 IDs, that is, each network may create up to 100 subnets, which can meet the needs of all the currently known scenarios. The first network is based on the provider-nic1-10ge and has a segment ID of 1-100, and the second network is based on the provider-nic2-10ge and has a segment ID of 101-200, increasing in sequence. The segment IDs of subnets in the provider network are allocated successively from the network segment range, where the segment ID of the first subnet of the first network is 1, the segment ID of the first subnet of the second network is 101, the segment ID of the first subnet of the third network is 201, and the segment ID of the first subnet of the fourth network is 301, completing the creation of the provider network.

In this way, the MANO automatically names the provider network according to the designed naming rule, automatically creates the provider network, performs the mapping of the physical network and the logical network, and divides the network segments, which can significantly improve the deployment and maintenance efficiency and reduce the possibility of errors caused by manual operations.

After step 103 is completed, the method in the embodiment of the disclosure proceeds to step 104, that is, the MANO creates at least one port and at least one VNFC in any one or more networks among the subnet of the first NS and the subnet of the first VNF, and connects the at least one port to the at least one VNFC in one to one correspondence, to provide network services for a client connected to the first slice network through the VNFC.

After completing the above process, the MANO parses out the internal and external network information of the VNF-level network in each NS network, and then names the required subnets and the ports to be created on the subnets according to the naming rule, and finally parses out the requirement of the deployment device in the VNFD and names the virtual machines in the deployment device according to the rule, to create instances on the DC for these virtual resources and complete the deployment of the entire system.

With the above method, the manual work procedures of the technicians can be reduced maximally, the opening and deployment efficiency of network slices can be improved, and the occurrence of errors can be reduced. Moreover, the above-mentioned process of creating the network slices is versatile. Through the abstract classification and grading of a variety of networks and the construction of models and rules, the realization complexity and difficulty of a variety of networks during orchestration can be reduced.

Figure 5:
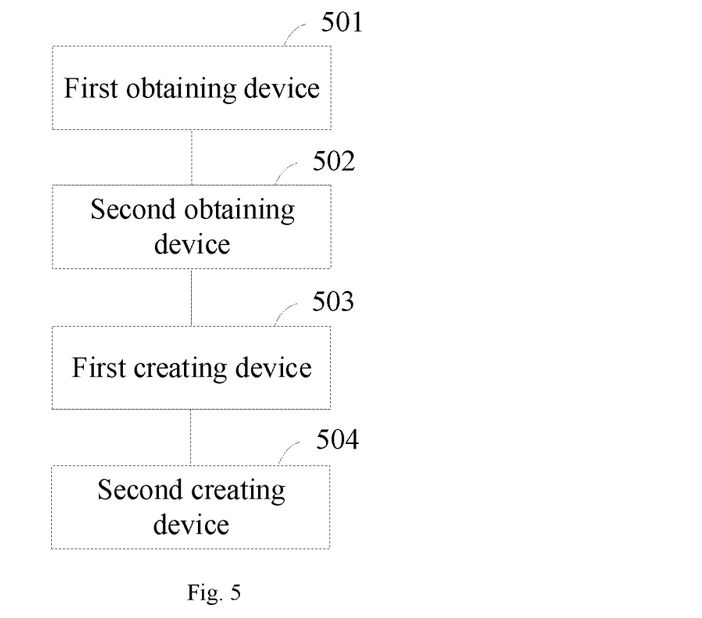
FIG. 5 is a schematic structural diagram of a management and orchestration system according to an embodiment of the disclosure.

A second aspect of the disclosure provides a management and orchestration system, which may be MANO. FIG. 5 is a schematic structural diagram of a management and orchestration system according to an embodiment of the disclosure, the management and orchestration system includes:

a first obtaining device 501 configured to obtain the name information of a first network slice to be created; and the name information includes the name of a data center network to which the first network slice belongs, the name of a first slice network contained in the first network slice, the name of a first NS contained in the first slice network, and the name of a first VNF contained in the first NS, and the data center network is established according to a preset provider network;

a second obtaining device 502 configured to obtain the first VNFD information corresponding to the first NS and the second VNFD information corresponding to the first VNF; and the MANO stores a plurality of preset NSs, a plurality of preset VNFs, the VNFD information corresponding to each of the plurality of preset NSs, and the VNFD information corresponding to each of the plurality of preset VNFs, the plurality of preset NSs include the first NS, and the plurality of preset VNFs include the first VNF;

a first creating device 503 configured to create the first slice network corresponding to the name of the first slice network, the first NS corresponding to the name of the first NS, a subnet of the first NS, the first VNF corresponding to the name of the first VNF, and a subnet of the first VNF according to the first VNFD information and the second VNFD information;

a second creating device 504 configured to create at least one port and at least one VNFC in any one or more networks among the subnet of the first NS and the subnet of the first VNF, and connect the at least one port to the at least one VNFC in one to one correspondence, to provide network services for a client connected to the first slice network through the VNFC.

Since the management and orchestration system according to the second aspect of the disclosure is proposed under the same concept as the method for creating the network slice provided in the first aspect of the disclosure, all kinds of variations and embodiments of the method for creating the network slice in the embodiments of FIGS. 1-4 described above are also applicable to the management and orchestration system of this embodiment. Through the foregoing detailed description of the method for creating the network slice, the implementation process of the management and orchestration system in this embodiment. Thus, for the sake of brevity of the specification, it will not be detailed here.

Figure 6:
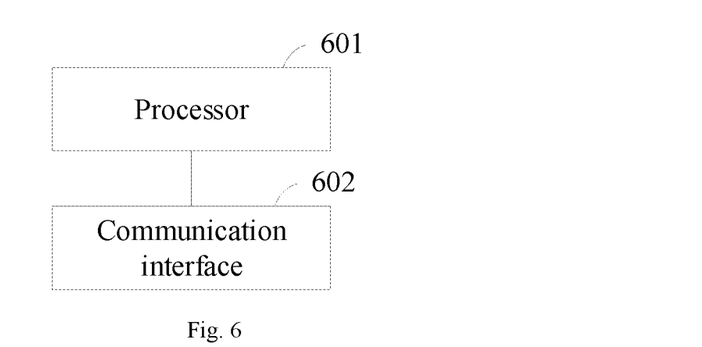
FIG. 6 is another schematic structural diagram of a management and orchestration system according to an embodiment of the disclosure.

A third aspect of the disclosure provides a management and orchestration system, which may be MANO. FIG. 6 is a schematic structural diagram of a management and orchestration system according to an embodiment of the disclosure. As shown in FIG. 6, the management and orchestration system includes a processor 601 and a communication interface 602, and:

the communication interface 602 is configured to obtain the name information of a first network slice to be created under the control of the processor; and the name information includes the name of a data center network to which the first network slice belongs, the name of a first slice network contained in the first network slice, the name of a first NS contained in the first slice network, and the name of a first VNF contained in the first NS, and the data center network is established according to a preset provider network; and obtain the first VNFD information corresponding to the first NS and the second VNFD information corresponding to the first VNF; and the MANO stores a plurality of preset NSs, a plurality of preset VNFs, the VNFD information corresponding to each of the plurality of preset NSs, and the VNFD information corresponding to each of the plurality of preset VNFs, the plurality of preset NSs include the first NS, and the plurality of preset VNFs include the first VNF;

the processor 601 is configured to create the first slice network corresponding to the name of the first slice network, the first NS corresponding to the name of the first NS, a subnet of the first NS, the first VNF corresponding to the name of the first VNF, and a subnet of the first VNF according to the first VNFD information and the second VNFD information; and create at least one port and at least one VNFC in any one or more networks among the subnet of the first NS and the subnet of the first VNF, and connect the at least one port to the at least one VNFC in one to one correspondence, to provide network services for a client connected to the first slice network through the VNFC. In one embodiment, the processor 601 may be a central processor, an Application Specific Integrated Circuit (ASIC), one or more integrated circuits for controlling the program execution, a hardware circuit developed by using the Field Programmable Gate Array (FPGA), a baseband processor.

In one embodiment, the processor 601 may include at least one processing core.

In one embodiment, the electronic device further includes a memory, where the memory may include a Read Only Memory (ROM), a Random Access Memory (RAM), and a magnetic disk memory. The memory is configured to store the data required by the processor 601 when running. The number of memories is one or more.

Since the management and orchestration system according to the third aspect of the disclosure is proposed under the same concept as the method for creating the network slice provided in the first aspect of the disclosure, all kinds of variations and embodiments of the method for creating the network slice in the embodiments of FIGS. 1-4 described above are also applicable to the management and orchestration system of this embodiment. Through the foregoing detailed description of the method for creating the network slice, the implementation process of the management and orchestration system in this embodiment. Thus, for the sake of brevity of the specification, it will not be detailed here.

A fourth aspect of the embodiments of the disclosure provides a computer device, which includes: at least one processor, and a memory and a communication interface communicatively connected to the at least one processor. The memory stores instructions that, when executed by the at least one processor, cause the at least one processor to perform the above method for creating the network slice via the communication interface.

A fifth aspect of the disclosure provides a computer readable storage medium. The computer readable storage medium stores computer instructions that, when running on a computer, cause the computer to perform the above method for creating the network slice.

The embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for creating a network slice, comprising:
   obtaining, by a Management and Orchestration system (MANO) name information of a first network slice to be created; wherein the name information comprises a name of a data center network to which the first network slice belongs, a name of a first slice network contained in the first network slice, a name of a first Network Service (NS) contained in the first slice network, and a name of a first Virtual Network Function (VNF) contained in the first NS, and the data center network is established according to a preset provider network;
   obtaining, by the MANO, first Virtualised Network Function Descriptor (VNFD) information corresponding to the first NS and second VNFD information corresponding to the first VNF; wherein the MANO stores a plurality of preset NSs, a plurality of preset VNFs, VNFD information corresponding to each of the plurality of preset NSs, and VNFD information corresponding to each of the plurality of preset VNFs, the plurality of preset NSs include the first NS, and the plurality of preset VNFs include the first VNF;
   creating, by the MANO, the first slice network corresponding to the name of the first slice network, the first NS corresponding to the name of the first NS, a subnet of the first NS, the first VNF corresponding to the name of the first VNF, and a subnet of the first VNF according to the first VNFD information and the second VNFD information;
   creating, by the MANO, at least one port and at least one Virtualised Network Function Component (VNFC) in any one or more networks among the subnet of the first NS and the subnet of the first VNF, and connecting the at least one port to the at least one VNFC in one to one correspondence, to provide network services for a client connected to the first slice network through the VNFC.

2. The method of claim 1, wherein creating, by the MANO, the first slice network, the first NS, a subnet of the first NS, the first VNF and a subnet of the first VNF according to the first VNFD information and the second VNFD information, comprises:
   creating, by the MANO, an external network contained in the first NS, a subnet of the external network contained in the first NS, an internal network contained in the first NS and a subnet of the internal network contained in the first NS according to the first VNFD information and a preset network design rule;
   creating, by the MANO, an internal network contained in the first VNF, a subnet of the internal network contained in the first VNF, an external network contained in the first VNF and a subnet of the external network contained in the first VNF according to the second VNFD information and the preset network design rule;
   wherein the preset network design rule is that the first slice network is created using the data center network, the external network contained in the first NS and the subnet of the external network contained in the first NS are created using any one of the data center network and the first slice network, the external network contained in the first VNF and the subnet of the external network contained in the first VNF are created using any one of the data center network, the first slice network and the external network contained in the first NS, the internal network contained in the first NS and the subnet of the internal network contained in the first NS are created according to a first provider network, the internal network contained in the first VNF and the subnet of the internal network contained in the first VNF are created according to a second provider network.

3. The method of claim 2, wherein creating, by the MANO, an internal network contained in the first NS and a subnet of the internal network contained in the first NS according to the first VNFD information and a preset network design rule, comprises:
   obtaining, by the MANO, N external connection points of the internal network contained in the first NS and a bandwidth required by each of the plurality of external connection points from the first VNFD information, wherein N is a positive integer;
   obtaining, by the MANO, physical network resources of each of a plurality of Virtualised Infrastructure Managers (VIMs) connected to the MANO itself; wherein the physical network resources are used to provide network services to provider networks created on the physical network resources, the physical network resources comprise M configured Network Interface Cards, NICs, and a bandwidth of each NIC, and M is an integer greater than or equal to N;
   selecting, by the MANO, a first VIM from the plurality of VIMs according to the number of the N external connection points and the bandwidth required by each external connection point;

creating, by the MANO, provider networks corresponding to the external connection points according to the N external connection points and the first VIM;

creating, by the MANO, the internal network contained in the first NS and the subnet of the internal network contained in the first NS on the provider networks corresponding to the external connection points.

4. The method of claim 3, wherein creating, by the MANO, provider networks corresponding to the external connection points according to the N external connection points and the first VIM, comprises:

determining, by the MANO, N mapping relationships according to the bandwidth required by each of the N external connection points and the bandwidth of each NIC; wherein the N external connection points one-to-one correspond to N NICs of the M NICs;

creating, by the MANO, N provider networks according to the N mapping relationships; wherein a name of each of the N provider networks includes an identity of an external connection point and an identity of an NIC contained in a mapping relationship corresponding to the provider network;

assigning, by the MANO, a network segment number to each of the N provider networks.

5. The method of claim 4, after the MANO assigns a network segment number to each of the N provider networks, the method further comprises:

assigning, by the MANO, a subnet segment number to the subnet of the internal network contained in the first NS from a network segment number of a provider network to which the subnet belongs according to ranking of the subnet in the provider network to which the subnet belongs.

6. A management and orchestration system, comprising:

a first obtaining unit configured to obtain name information of a first network slice to be created; wherein the name information comprises a name of a data center network to which the first network slice belongs, a name of a first slice network contained in the first network slice, a name of a first Network Service (NS) contained in the first slice network, and a name of a first Virtual Network Function (VNF) contained in the first NS, and the data center network is established according to a preset provider network;

a second obtaining unit configured to obtain first Virtualised Network Function Descriptor (VNFD) information corresponding to the first NS and second VNFD information corresponding to the first VNF; wherein the MANO stores a plurality of preset NSs, a plurality of preset VNFs, VNFD information corresponding to each of the plurality of preset NSs, and VNFD information corresponding to each of the plurality of preset VNFs, the plurality of preset NSs include the first NS, and the plurality of preset VNFs include the first VNF;

a first creating unit configured to create the first slice network corresponding to the name of the first slice network, the first NS corresponding to the name of the first NS, a subnet of the first NS, the first VNF corresponding to the name of the first VNF, and a subnet of the first VNF according to the first VNFD information and the second VNFD information;

a second creating unit configured to create at least one port and at least one Virtualised Network Function Component (VNFC) in any one or more networks among the subnet of the first NS and the subnet of the first VNF, and connect the at least one port to the at least one VNFC in one to one correspondence, to provide network services for a client connected to the first slice network through the VNFC.

7. The management and orchestration system of claim 6, wherein the first creating unit is configured to:

create an external network contained in the first NS, a subnet of the external network contained in the first NS, an internal network contained in the first NS and a subnet of the internal network contained in the first NS according to the first VNFD information and a preset network design rule;

create an internal network contained in the first VNF, a subnet of the internal network contained in the first VNF, an external network contained in the first VNF and a subnet of the external network contained in the first VNF according to the second VNFD information and the preset network design rule;

wherein the preset network design rule is that the first slice network is created using the data center network, the external network contained in the first NS and the subnet of the external network contained in the first NS are created using any one of the data center network and the first slice network, the external network contained in the first VNF and the subnet of the external network contained in the first VNF are created using any one of the data center network, the first slice network and the external network contained in the first NS, the internal network contained in the first NS and the subnet of the internal network contained in the first NS are created according to a first provider network, the internal network contained in the first VNF and the subnet of the internal network contained in the first VNF are created according to a second provider network.

8. The management and orchestration system of claim 7, wherein the first creating unit is configured to:

obtain N external connection points of the internal network contained in the first NS and a bandwidth required by each of the plurality of external connection points from the first VNFD information, wherein N is a positive integer;

obtain physical network resources of each of a plurality of Virtualised Infrastructure Managers (VIMs) connected to the MANO itself; wherein the physical network resources are used to provide network services to provider networks created on the physical network resources, the physical network resources comprise M configured Network Interface Cards, NICs, and a bandwidth of each NIC, and M is an integer greater than or equal to N;

select a first VIM from the plurality of VIMs according to the number of the N external connection points and the bandwidth required by each external connection point;

create provider networks corresponding to the external connection points according to the N external connection points and the first VIM;

create the internal network contained in the first NS and the subnet of the internal network contained in the first NS on the provider networks corresponding to the external connection points.

9. The management and orchestration system of claim 8, wherein the first creating unit is configured to:

determine N mapping relationships according to the bandwidth required by each of the N external connection points and the bandwidth of each NIC; wherein the N external connection points one-to-one correspond to N NICs of the M NICs;

create N provider networks according to the N mapping relationships; wherein a name of each of the N provider networks includes an identity of an external connection point and an identity of an NIC contained in a mapping relationship corresponding to the provider network;

assign a network segment number to each of the N provider networks.

10. The management and orchestration system of claim 9, wherein after the MANO assigns a network segment number to each of the N provider networks, the first creating unit is further configured to:

assign a subnet segment number to the subnet of the internal network contained in the first NS from a network segment number of a provider network to which the subnet belongs according to ranking of the subnet in the provider network to which the subnet belongs.

11. A computer device, comprising:

at least one processor, and a memory and a communication interface communicatively connected to the at least one processor;

wherein the memory stores instructions that, when executed by the at least one processor, cause the at least one processor to perform the method of claim 1 via the communication interface.

12. A non-transitory computer readable storage medium storing computer instructions that, when running on the computer, cause the computer to perform the method of claim 1.

* * * * *